(12) United States Patent  
Irie (10) Patent No.: US 7,066,556 B2  
(45) Date of Patent: Jun. 27, 2006

(54) BICYCLE HUB (75) Inventor: Yoshinori Irie, Osakasayama (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/745,617

(22) Filed: Dec. 29, 2003

(65) Prior Publication Data  
US 2004/0135425 A1 Jul. 15, 2004

(30) Foreign Application Priority Data  
Jan. 9, 2003 (JP) ............................. 2003-002753

(51) Int. Cl.  
B60B 19/00 (2006.01)  
B62L 3/00 (2006.01)

(52) U.S. Cl. ...................... 301/6.9; 301/110.5; 188/26; 188/24.11

(58) Field of Classification Search ................. 301/6.1, 301/6.8–6.9, 59, 105.1, 110.5, 110.6; 188/24.11, 188/26, 18 A, 382, 218 XL  
See application file for complete search history.

(56) References Cited

U.S. PATENT DOCUMENTS

| | | | |
|---|---|---|---|
| 2,290,451 A | * | 7/1942 | Schwinn .................... 301/6.9 |
| 3,985,391 A | * | 10/1976 | Hoffman et al. ............. 301/6.9 |
| 4,170,369 A | | 10/1979 | Strutman |
| 5,626,401 A | | 5/1997 | Terry, Sr. et al. |
| 5,950,772 A | * | 9/1999 | Buckley et al. ............... 188/26 |
| 6,318,810 B1 | * | 11/2001 | Miyake et al. ........... 301/110.5 |
| 6,336,531 B1 | | 1/2002 | Chou |
| 6,352,314 B1 | | 3/2002 | Tabe |
| 6,354,669 B1 | * | 3/2002 | Tabe ....................... 301/110.5 |
| 6,540,306 B1 | * | 4/2003 | Kanehisa ..................... 301/59 |
| 6,571,920 B1 | | 6/2003 | Sturmer et al. |
| 6,880,897 B1 | * | 4/2005 | Goss et al. .................. 301/6.9 |

FOREIGN PATENT DOCUMENTS

| | | |
|---|---|---|
| DE | 20009502 U1 | 8/2000 |
| DE | 19926641 A1 | 12/2000 |
| FR | 2783491 A | 3/2000 |
| JP | 04328001 A | 11/1992 |
| JP | 05221202 A | 8/1993 |
| JP | 11321206 A | 11/1999 |
| JP | 2001246904 A | 9/2001 |

* cited by examiner

Primary Examiner—Jason R. Bellinger  
(74) Attorney, Agent, or Firm—Shinjyu Global IP Counselors (57) ABSTRACT A hub is configured to suppress deformation in a disc rotor even if the disc rotor is made thinner and more lightweight, and to suppress wobbling in a braking surface. The hub has a hub axle, a hub shell, a pair of bearings, and a brake mount. The hub shell has spoke attachment parts with spoke attachment holes and disposed at both ends for attaching a plurality of spokes. The brake mount has a rotor attachment unit for attaching a disc rotor of a disc brake. The rotor attachment unit is integrally formed with a first spoke attachment part and is disposed radially farther out than the minimum radial position at which the spokes are attached.

19 Claims, 11 Drawing Sheets

BICYCLE HUB

CROSS-REFERENCE TO RELATED APPLICATION

This application claims priority to Japanese Patent Application No. 2003-002753. The entire disclosure of Japanese Patent Application No. 2003-002753 is hereby incorporated herein by reference.

BACKGROUND OF THE INVENTION

1. Field of the Invention

The present invention generally relates to a bicycle hub. More particularly, the present invention relates a bicycle hub with an integrated brake mounting structure for mounting a disc rotor.

2. Background Information

Bicycle wheels are provided with centrally located hubs for rotatably mounting the wheels in the bicycle frame. Conventional hubs comprise a hub axle nonrotatably mounted on the frame, a hub shell disposed around the outside of the hub axle, and a pair of left and right bearings disposed between the hub axle and the hub shell.

Conventionally known examples of such bicycle hubs include those in which a disc rotor of a disc brake device can be mounted on the hub shell. For example, such a bicycle hub is disclosed in Japanese Laid-Open Patent Application No. 2001-246904 (see FIGS. 2 and 6). Thus, some conventional bicycle hubs comprise a rotor attachment unit for fixing the disc rotor in place. A disc rotor typically has an outer ring with a braking surface held between brake pads accommodated by a brake caliper, an inner ring fixed to the rotor attachment unit, and an arm for linking the two rings. Fitting holes connected to the rotor attachment unit are formed at intervals in the circumferential direction of the inner ring. Rotor attachment unit has a plurality protruding portions that are formed at intervals in the circumferential direction on one end of the hub shell. Threaded holes are formed in the protruding portions. The disc rotor is fixed in the rotor attachment unit by screwing bolts into the threaded holes through the fitting holes.

In the conventional configuration, the inner ring provided to the internal periphery of the disc rotor is fixed in the rotor attachment unit. The inner ring is linked to the outer ring by an arm extending from the outer ring that has a braking surface to the internal peripheral side. Thus, when the rotor is fixed to the hub shell at a location a considerable distance away from the braking surface of the disc rotor, the thickness of the disc rotor must be increased to suppress deformation in the disc rotor during braking, making it difficult to lighten the weight of the entire structure. Also, since the diameter of the fixed portion is far smaller than that of the braking surface, there is danger that wobbling will occur in the braking surface and precision will be reduced.

In view of the above, it will be apparent to those skilled in the art from this disclosure that there exists a need for an improved bicycle hub. This invention addresses this need in the art as well as other needs, which will become apparent to those skilled in the art from this disclosure.

SUMMARY OF THE INVENTION

One object of the present invention is to make it possible to suppress deformation even in a thinner and more-light-weight disc rotor and also to suppress wobbling of the braking surface in a bicycle hub wherein a disc rotor can be mounted.

In accordance with a first aspect of the present invention, a bicycle hub is provided that comprises a hub axle, a hub shell and a brake mount.

The hub axle has a center axis. The hub shell is rotatably supported on the hub axle by bearings about the center axis. The hub shell has a first end with a first spoke attachment part with a plurality of first spoke attachment points spaced in a radial direction from the center axis for attaching a plurality of first spokes thereto and a second end with a second spoke attachment parts with a plurality of second spoke attachment points spaced in the radial direction from the center axis for attaching a plurality of second spokes. The brake mount has a rotor attachment unit integrally formed as a one-piece, unitary member with the first spoke attachment part. The rotor attachment unit is configured and arranged with a plurality of rotor attachment points to secure a disc rotor of a disc brake device thereto. The rotor attachment points of the brake mount are disposed radially farther out than a minimum radial position of the first spoke attachment points at which the first spokes are attached to the first spoke attachment part.

In this bicycle hub, since the rotor attachment unit on which the disc rotor is mounted is disposed radially farther out than the minimum radial position at which the spokes are attached, the disc rotor can be mounted on the hub shell at a location near the braking surface. Therefore, deformations in the disc rotor can be suppressed even if the thickness of the disc rotor is decreased to reduce weight, and wobbling of the disc rotor can also be suppressed.

In accordance with a second aspect of the present invention, a bicycle hub is provided that includes a hub according to the first aspect of the present invention, wherein the brake mount has a plurality of first arms provided to the first end of the hub shell and made to protrude in the radial direction in a radial pattern farther out in the radial direction than the first spoke attachment part, the rotor attachment unit is provided to the tips of the first arms, and the first spoke attachment points are disposed midway on the first arms. In this case, the first radially protruding arms are provided with a rotor attachment unit and a spoke attachment part, allowing the configuration of the hub to be simplified and the weight of the hub to be reduced.

In accordance with a third aspect of the present invention, a bicycle hub is provided that includes a hub according to the second aspect of the present invention, wherein the second end of the hub has second arms provided in the same shape as the first arms, except that the tips do not have a rotor attachment unit, and wherein the second spoke attachment points are disposed mounted midway on the second arms. In this case, the left and right arms can be given the same shape everywhere except in the area of the rotor attachment unit, making it possible to obtain a preferred appearance in terms of design as well.

In accordance with a fourth aspect of the present invention, a bicycle hub is provided that includes a hub according to the second aspect of the present invention, wherein the first and second spoke attachment parts are formed on first and second annular hub flanges that extend in the radial direction of the hub shell, and the first arms are mounted on the first annular hub flange to protrude farther out in the radial direction in the radial pattern. In this case, the arms extend from the first hub flange, making it easier to use standardized spokes.

In accordance with a fifth aspect of the present invention, a bicycle hub is provided that includes a hub according to any one of the first to fourth aspects of the present invention, wherein the rotor attachment unit protrudes farther out in relation to the radial direction of the hub axle than the spoke attachment points of the first spoke attachment part. In this case, the rotor attachment unit is disposed farther out than the spoke attachment points, allowing interference between the disc rotor and the spokes to be easily avoided, and the spokes and disc rotor to be easily mounted.

In accordance with a sixth aspect of the present invention, a bicycle hub is provided that includes a hub according to any one of the first to fifth aspects of the present invention, wherein the hub axle is configured and arranged to be mounted on a front fork of a bicycle. In this case, it is possible to suppress the deformation and wobbling of the disc rotor even with a reduced thickness of the disc rotor mounted on the front hub, which requires more braking force than the rear wheel.

In accordance with a seventh aspect of the present invention, a bicycle hub is provided that includes a hub according to any one of the first to fifth aspects of the present invention, wherein the second end of the hub shell includes a freewheel operatively coupled between the axle and the second end of the hub shell and in which at least one sprocket is mounted on an outer periphery of the freewheel. In this case, it is possible to suppress the deformation and wobbling of the disc rotor even with a reduced thickness of the disc rotor mounted on the rear hub.

In accordance with an eighth aspect of the present invention, a bicycle hub is provided that includes a hub according any one of the first to seventh aspects of the present invention, wherein the first and second spoke attachment points are holes that includes spoke nipples coupled thereto. In this case, the nipples of the spokes with spoke wires for joining the nipples together are locked in the two locking parts, making it easier to provide the spoke attachment parts to the two radial arms.

In accordance with a ninth aspect of the present invention, a bicycle hub is provided that includes a hub according to any one of the first to seventh aspects of the present invention, wherein the first and second spoke attachment parts are holes that includes heads of spoke wires of spokes coupled thereto. In this case, a regular standardized spoke wire can be readily used.

In accordance with a tenth aspect of the present invention, a bicycle hub is provided that includes a hub according to any one of the first to ninth aspects of the present invention, wherein the hub axle includes a through-hole is formed in the center of the hub axle, with a quick release mechanism having a quick hub rod in which threaded portions are formed in both ends and which passes through the through-hole. In this case, the hub can be rapidly attached to and released from the frame by means of the quick release mechanism.

According to the present invention, the rotor attachment unit for mounting the disc rotor is disposed radially farther out than the minimum radial position at which the spokes are locked, making it possible to mount the disc rotor on the hub shell at a location near the braking surface. Therefore, it is possible to suppress deformation in the disc rotor even if the disc rotor is made thinner and more lightweight, and it is also possible to suppress wobbling in the disc rotor.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
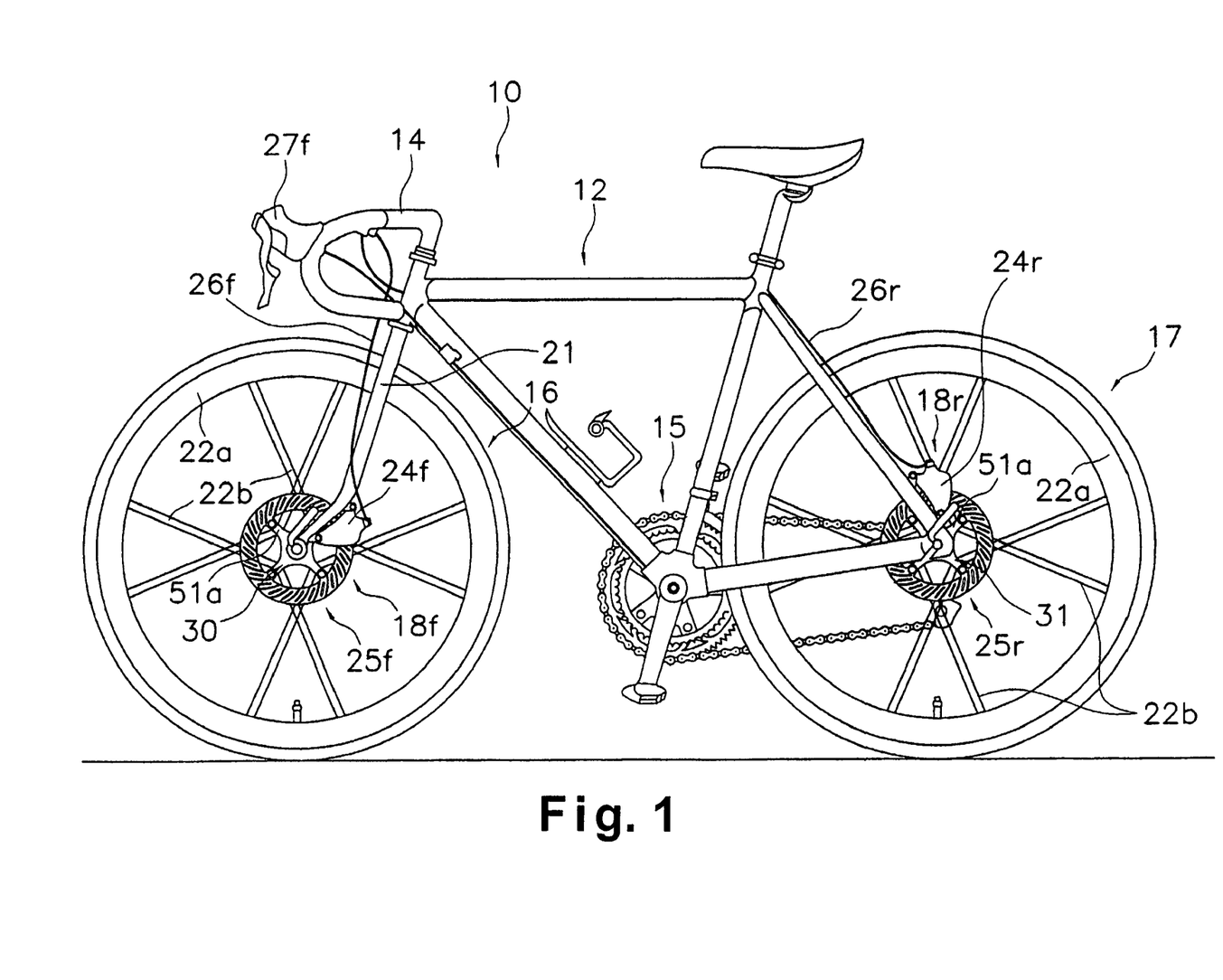
FIG. 1 is a side elevational view of a bicycle employing a bicycle hub in accordance with one embodiment of the present invention.

Referring initially to FIG. 1, a bicycle 10 is illustrated in accordance with a first embodiment of the present invention. The bicycle 10 basically comprises a frame 12 including a front fork 21; a handlebar 14 fixed to the front fork 21; a drive train 15 comprising a chain, pedals, a derailleur, and the like; front and rear wheels 16 and 17 mounted on the front and back of the frame 12 and provided with rims 22a, spokes 22b, and front and rear hubs 30 and 31; and front and rear disc brakes 18f and 18r.

Figure 4:
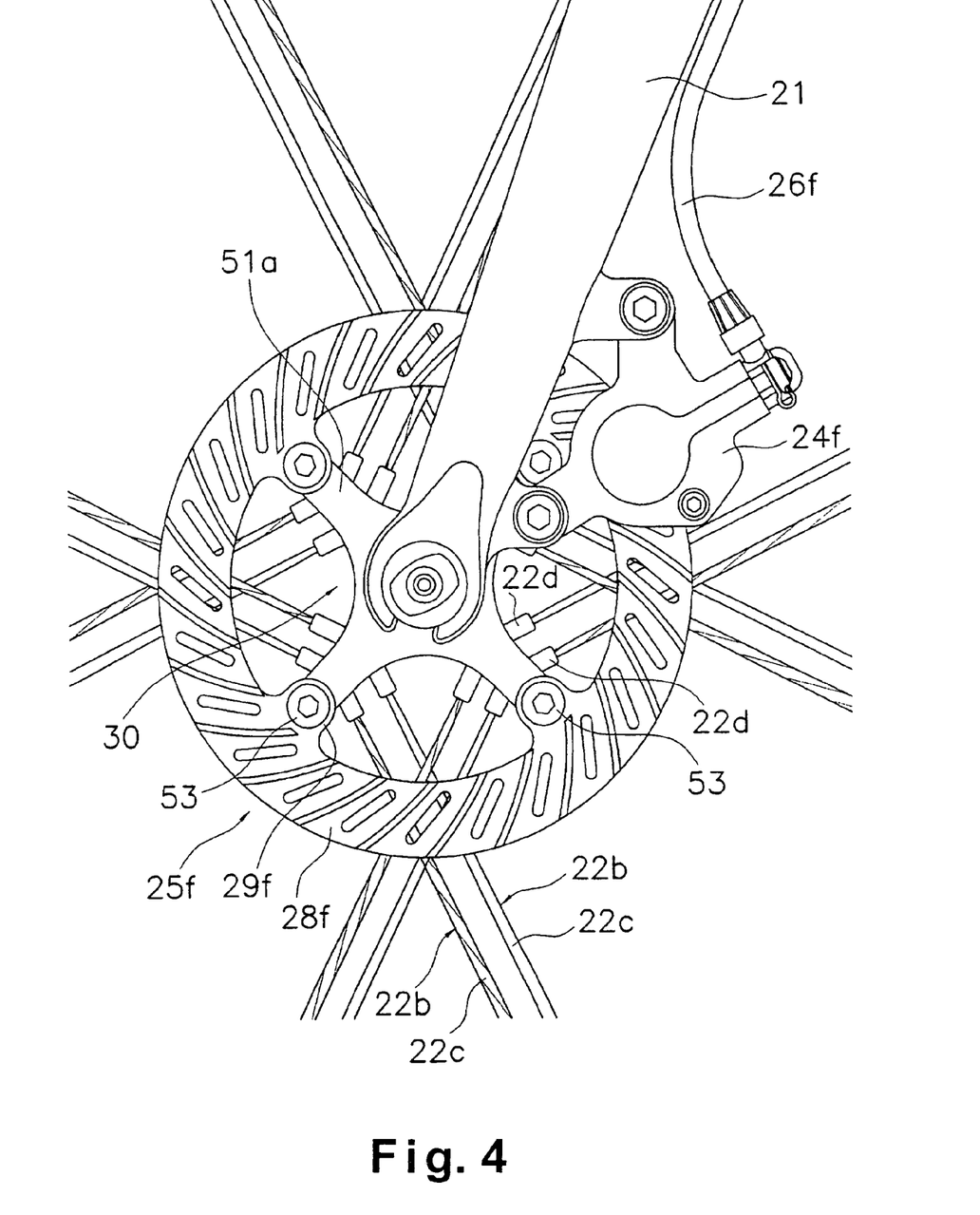
FIG. 4 is a fragmentary side elevational view of the front hub illustrated in FIGS. 1 and 2A according to the present invention.

The disc brakes 18f and 18r have brake calipers 24f and 24r, respectively, mounted on the bicycle frame 12, and disc rotors 25f and 25r mounted on the front and rear hubs 30 and 31, respectively. The brake calipers 24f and 24r are linked to pistons (not shown) provided to the front and rear brake levers (only the rear brake lever 27f is shown) via hydraulic tubes 26f and 26r. As shown in FIGS. 1 and 4, the disc rotors 25f and 25r have ring-shaped braking surfaces (only 28f is shown in FIG. 4) held between the brake calipers 24f and 24r. Four mounting parts (only 29f is shown in FIG. 4) are mounted on the front and rear hubs 30 and 31 on the internal peripheral side thereof. The mounting parts 29f are disposed at intervals spaced apart in the circumferential direction, and are formed protruding from the braking surfaces 28f and slightly inward in the radial direction. The mounting parts of the disc rotor 25r are similarly constructed to the mounting parts 29f, as just discussed. Preferably, the disc rotors 25f and 24r are identical.

Figure 2A:
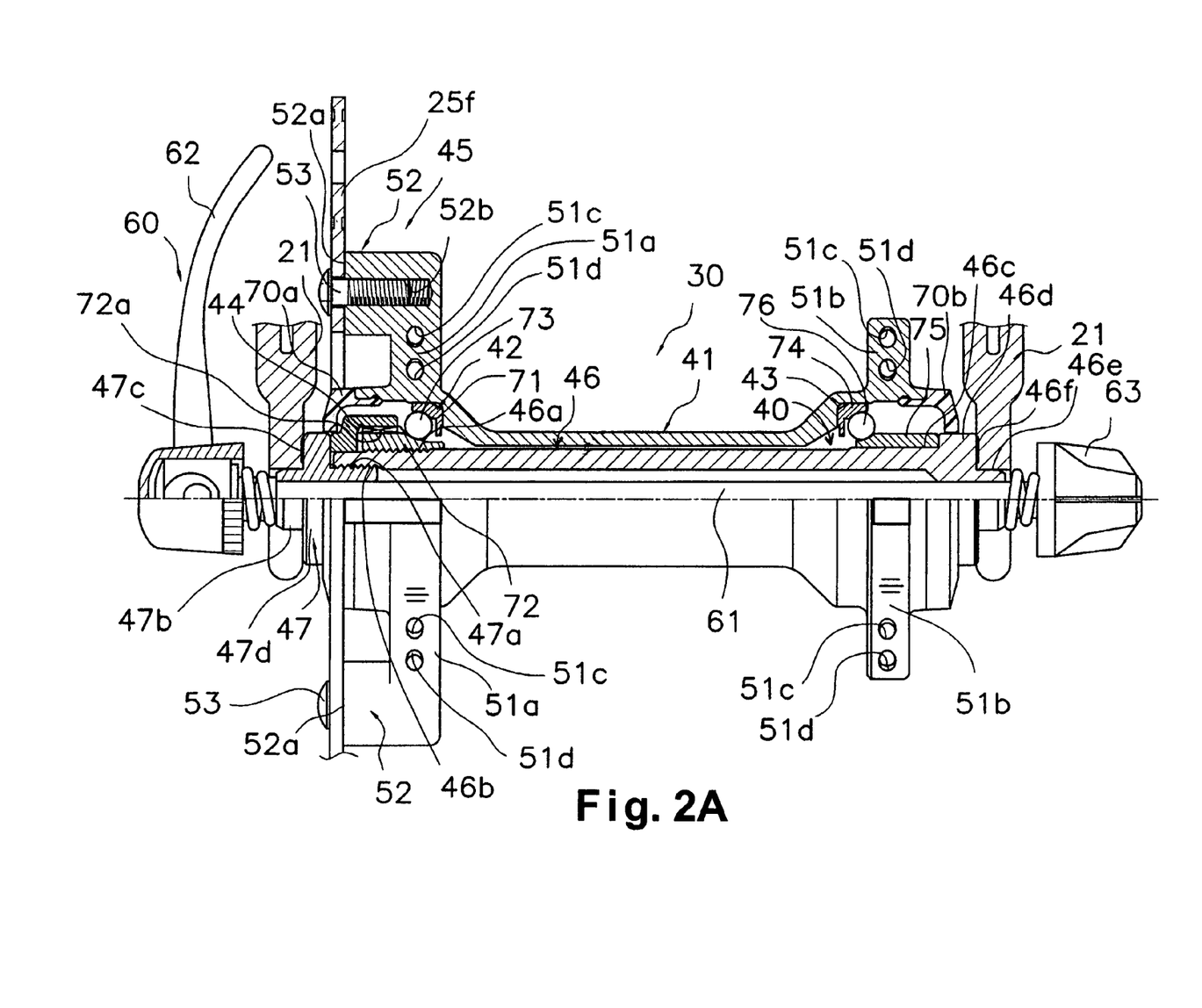
FIG. 2A is a cutaway elevational view of the front hub according to one embodiment of the present invention.

As shown in FIG. 1, the front hub 30 is designed for rotatably mounting the front wheel 16 in the front fork 21. The front hub 30 is linked with the rim 22a of the front wheel 16 via a plurality of spokes 22b. As shown in FIG. 2, the front hub 30 comprises a hub axle 40 nonrotatably fixed to the front fork 21, a hub shell 41 disposed around the outside of the hub axle 40, first and second bearings 42 and 43 disposed between the hub axle 40 and the hub shell 41, a detent member 44 for locking a first hub cone 72 of the first bearing 42 in relation to the hub axle 40, and a brake mount 45 for mounting the front disc rotor 25f. In the front hub 30, both ends of the hub axle 40 are fixed to both the left and right front forks 21 by a known quick release mechanism 60 having a hub rod 61 as well as a cam lever 62 and a nut 63 disposed at either end thereof.

The hub axle 40 is made, for example, from an A7075 aluminum alloy with a high degree of strength, the hub rod 61 of the quick release mechanism 60 passes through the interior, and both ends are fixed to the tips of the front fork 21 by the quick release mechanism 60. The hub axle 40 has a hollow first spindle 46 and a hollow second spindle 47 screwed together with the first spindle 46.

Referring now to FIG. 2A, the first spindle 46 is an axle constituting a large portion of the hub axle 40. The bearings 42 and 43 are mounted at each end of the first spindle 46, with the second spindle 47 being screwed into one end (the left end in FIG. 2A) of the first spindle 46. An external thread 46a is formed on the external peripheral surface of one end of the first spindle 46 for screwing the first hub cone 72 of the first bearing 42, and an internal thread 46b is formed on the internal peripheral surface of the same end for screwing in the second spindle 47. Also, chamfers (not shown) disposed parallel to each other whereby the detent member 44 is non-rotatably locked are formed on the external peripheral surface of the one end.

The first spindle 46 has a press-in part 46c with a second hub cone 75 of the second bearing 43 press-fitted thereon. An annular protrusion 46d is formed on the first spindle 46 adjacent to the press-in part 46c for positioning the second bearing 43. The protrusion 46d extends farther out in relation to the axial direction from the remainder of the first spindle 46. The press-in part 46c and the protrusion 46d are formed at the other end (the right end in FIG. 2A) of the first spindle 46 from the second spindle 47. A small-diameter fork fixing part 46e fixed to the front fork 21 is also formed at the other end. A knurled part 46f is formed in the shape of radial irregularities at the end surface of the section in which a step is formed in relation to the fork fixing part 46e for rotatably locking with the front fork 21.

The second spindle 47 is a cylindrical member with a smaller diameter than the first spindle 46. The second spindle 47 has an external thread 47a screwed into the internal thread 46b of the first spindle 46. The external thread 47a is formed on the external peripheral surface at the right end in FIG. 2A. A small-diameter fork fixing part 47b is also formed at the left end for fixing to the front fork 21. A knurled part 47c is formed in the shape of radial irregularities at the end surface of the section in which a step is formed in relation to the fork fixing part 47b for rotatably locking with the front fork 21. A large-diameter flange 47d is formed between the external thread 47a and the fork fixing part 47b. The flange 47d is provided to retain the detent member 44. A tool locking part (not shown) with six sides to allow rotation by tools is formed on the internal peripheral surface at one end of the second spindle 47.

The hub shell 41 is made, for example, from A6151 or another such lightweight aluminum alloy with a comparatively high degree of strength, and is a substantially symmetrical cylindrical member whose center section is narrowed down, as shown in FIG. 2A. For example, four first and second arms 51a and 51b that extend in a radial pattern and have substantially the same shape are formed on the external peripheral surface of the large-diameter section of the hub shell 41.

A rotor attachment unit 52 is integrally formed on the tips of the first arms 51a. The rotor attachment unit 52 is preferably made of a plurality of individual attachment points or members that have a shape of a round bar extending farther out in relation to the direction of the hub axle 40. The first arms 51a and second arms 51b have substantially the same shape, with the exception of the rotor attachment unit 52 formed on the free ends of the first arms 51a. The first arms 51a and the rotor attachment unit 52 constitute the brake mount 45.

Two spoke attachment holes 51c and 51d, for example, are formed at spaced intervals in the radial direction on the side surface in the direction of rotation in the middle of the first and second arms 51a and 51b. The nipples 22d of the spokes 22b that have spoke wires 22c, with the flanged nipples 22d screwed to the tips of the spoke wires 22c. The nipples 22d are secured in the spoke attachment holes 51c and 51d.

The spoke attachment holes 51c and 51d are formed at a slight slant in the radial direction away from a tangent to an arc about the hub axle 40. Thus, the two attachment holes 51c and 51d are inclined in opposite directions, such that the spokes 22b extend in different directions. Moreover, the spoke attachment holes 51c and 51d are inclined in opposite directions in the first arms 51a and the second arms 51b. Therefore, of the two groups of spokes 22b drawn in alignment in FIG. 4, the hatched spokes are alternately locked by the spoke attachment holes 51c and 51d of the first arms 51a, while the remaining spokes are alternately locked by the spoke attachment holes 51c and 51d of the second arms 51b.

Cover members 70a and 70b made from a synthetic resin, for example, for covering gaps with the hub axle 40 are detachably mounted on the two ends of the hub shell 41.

As shown in FIG. 2A the first bearing 42 has a first socket 71 provided to the hub shell 41, a first hub cone 72 screwed onto the hub axle 40, and a plurality of balls 73 that roll between the first hub cone 72 and the first socket 71 while in contact with both.

Serrations 72a comprising a plurality of concavities and convexities formed in alignment in the circumferential direction are formed on the external peripheral surface of the first hub cone 72, and the detent member 44 engages these serrations 72a to rotatably lock the first hub cone 72.

As shown in FIG. 2A, the second bearing 43 has a second socket 74 provided to the hub shell 41, a second hub cone 75 fixed to the hub axle 40, and a plurality of balls 76 that roll between the second hub cone 75 and the second socket 74 while in contact with both. The second socket 74 is a member of the same shape and material as the first socket 71. The second hub cone 75 is press-fitted by the press-in part 46c of the first spindle 46 of the hub axle 40. The second hub cone 75 is positioned by the protrusion 46d.

The detent member 44 is made, for example, from A6151 or another such lightweight aluminum alloy with a comparatively high degree of strength. As shown in FIG. 2A, the detent member 44 is a cylindrical member having two internal peripheral surfaces with different diameters. The internal peripheral surface of the detent member 44 with the smaller diameter is nonrotatably linked to the first spindle 46, while the internal peripheral surface of the detent member 44 with the larger diameter is nonrotatably linked to the first hub cone 72. Since the detent member 44 is nonrotatably stopped with the hub axle 40 and the first hub cone 72, the first hub cone 72 can be rotatably locked in relation to the hub axle 40.

As previously described, the brake mount 45 has, for example, four first arms 51a with the rotor attachment unit 52 formed at the tips of the first arms 51a. An attachment surface 52a is formed on each of the first arms 51a by mechanical working so as to be disposed in the same plane at the tip of the rotor attachment unit 52. A threaded hole 52b is formed in the attachment surface 52a into which an attachment bolt 53 is threadedly inserted for attaching a disc rotor 25f. A centering part (not shown) is also formed in the attachment surface 52a for aligning the center of the disc rotor 25f with the center of the hub axle 40.

When the disc rotor 25f is mounted to the front hub 30, the disc rotor 25f is fixed to the front hub 30 by threadedly inserting the attachment bolts 53 into the threaded holes 52b in a state in which the disc rotor 25f is centered. Since the hub 30 is structured such that the first arms 51 a with the spoke attachment holes 51c and 51d in the middle are provided to the side of the front hub 30, and the disc rotor 25f is mounted on the rotor attachment unit 52 integrally formed on the tips of the first arms 51a, the braking surface 28f and the rotor attachment unit 52 are kept in close proximity to each other. Therefore, it is possible to suppress deformation in the disc rotor 25f even while reducing the thickness of the disc rotor 25f to lighten the weight, and it is also possible to suppress wobbling of the disc rotor 25f.

Figure 2B:
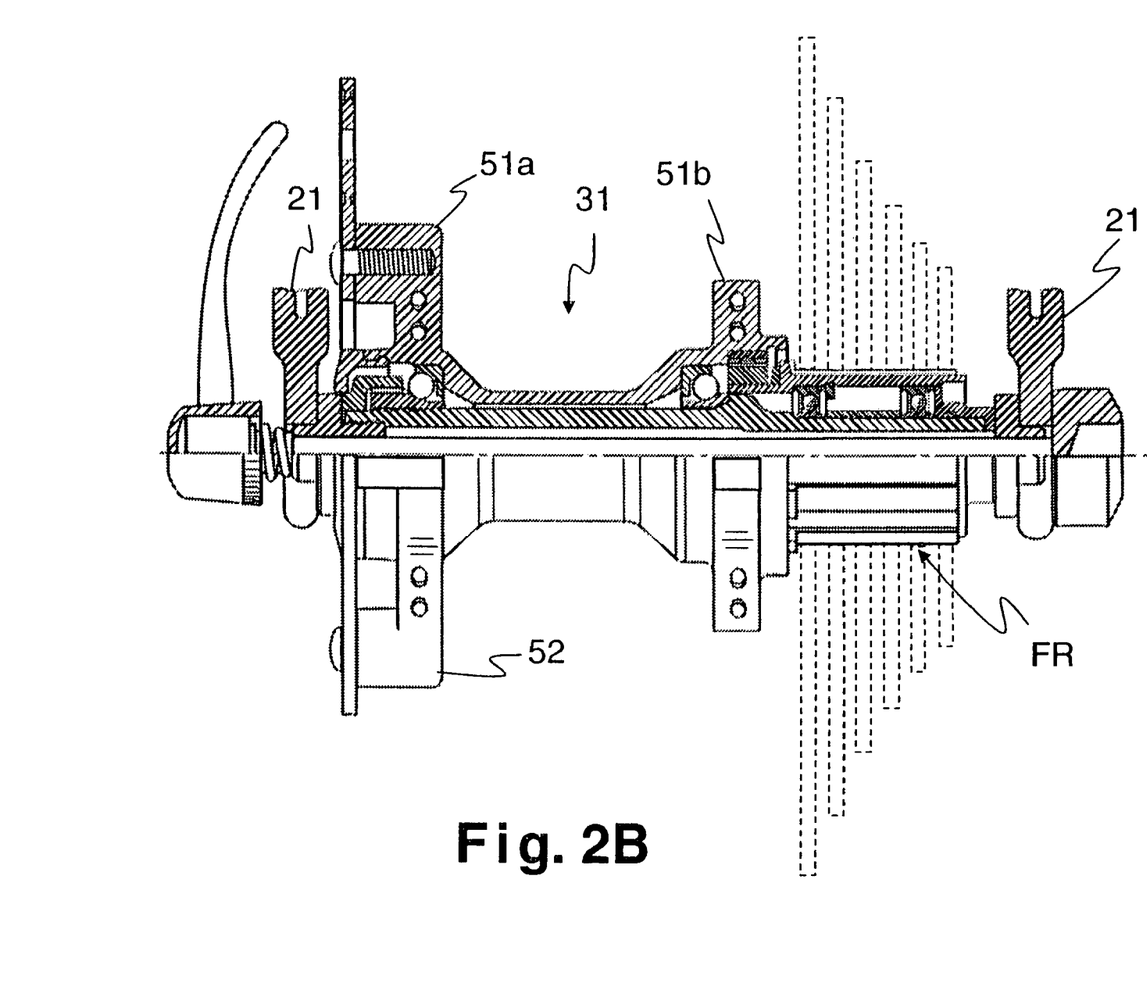
FIG. 2B is a cutaway elevational view of the rear hub according to one embodiment of the present invention.
Figure 3:
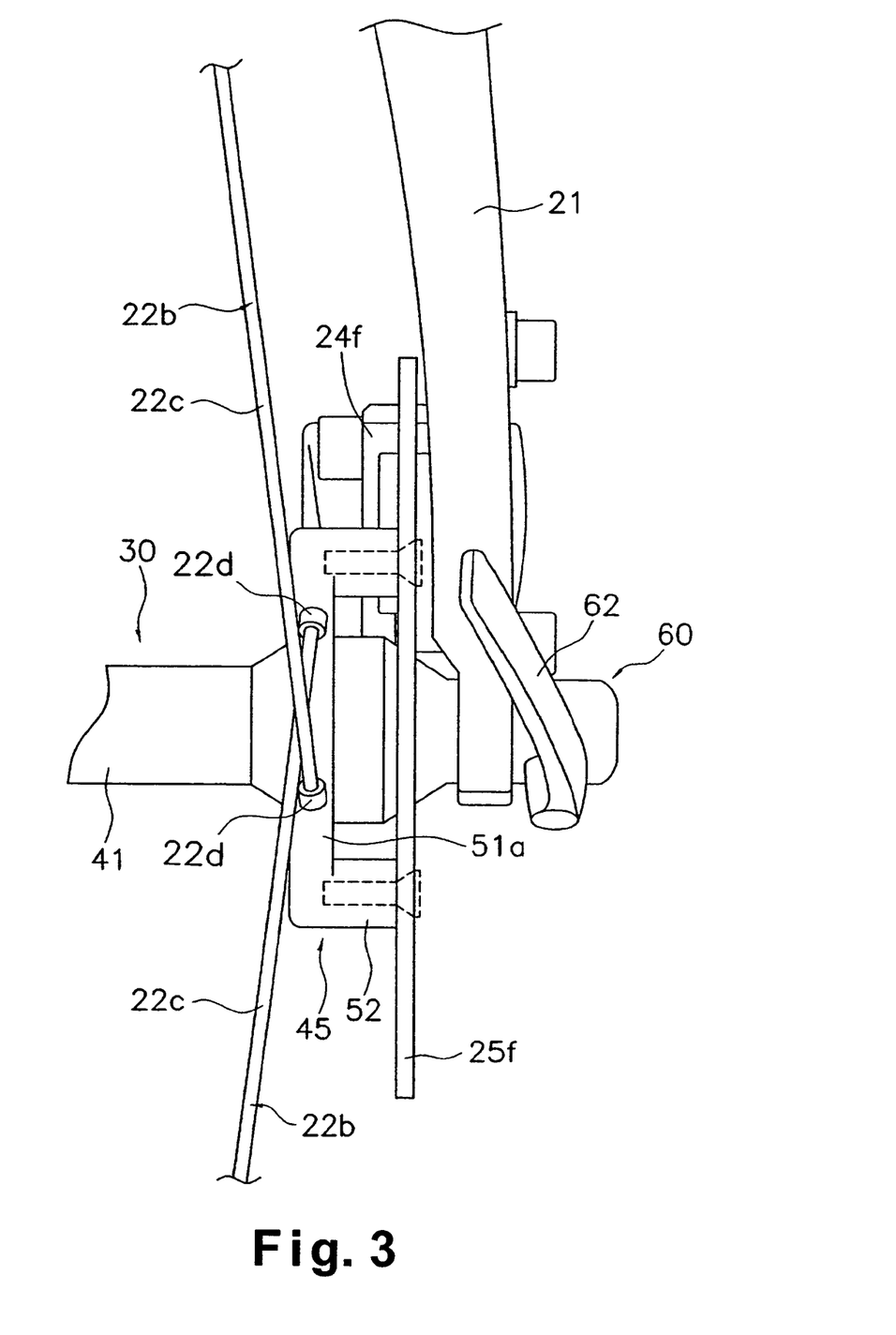
FIG. 3 is a fragmentary front elevational view of the front hub illustrated in FIGS. 1 and 2A according to the present invention.

As shown in FIGS. 1 and 2B, a disc rotor 25r is also mounted in the same structure on the rear hub 31 equipped with a freewheel FR. Specifically, first and second arms 51a and 51b are also formed on the rear hub 31, and a rotor attachment unit 52 is integrally formed on the tips of the first arms 51a. These components constitute a brake mount 45 for fixing the disc rotor 25r on the rear hub 31.

OTHER EMBODIMENTS

Figure 5:
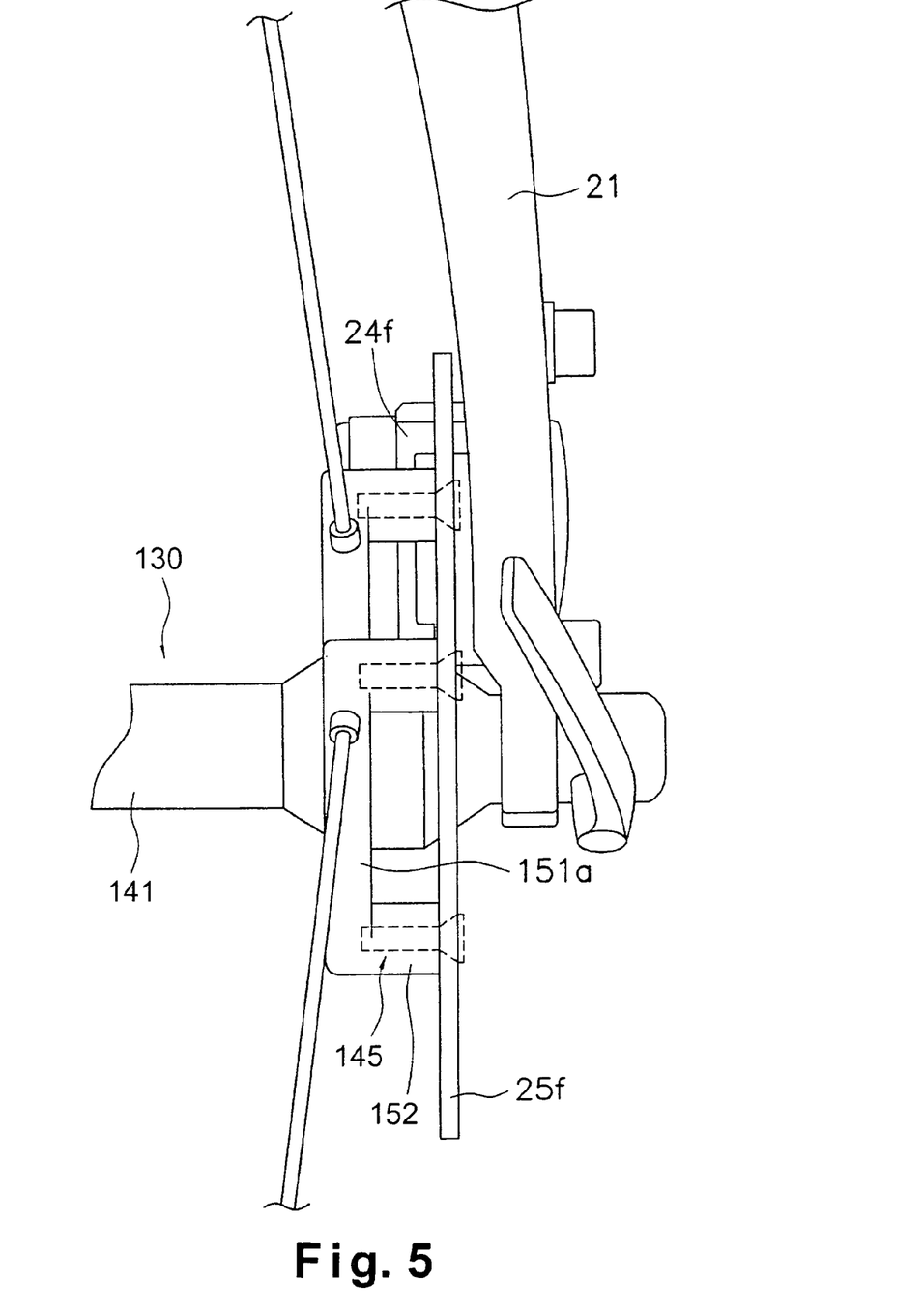
FIG. 5 is a diagram corresponding to FIG. 3 of another embodiment.
Figure 6:
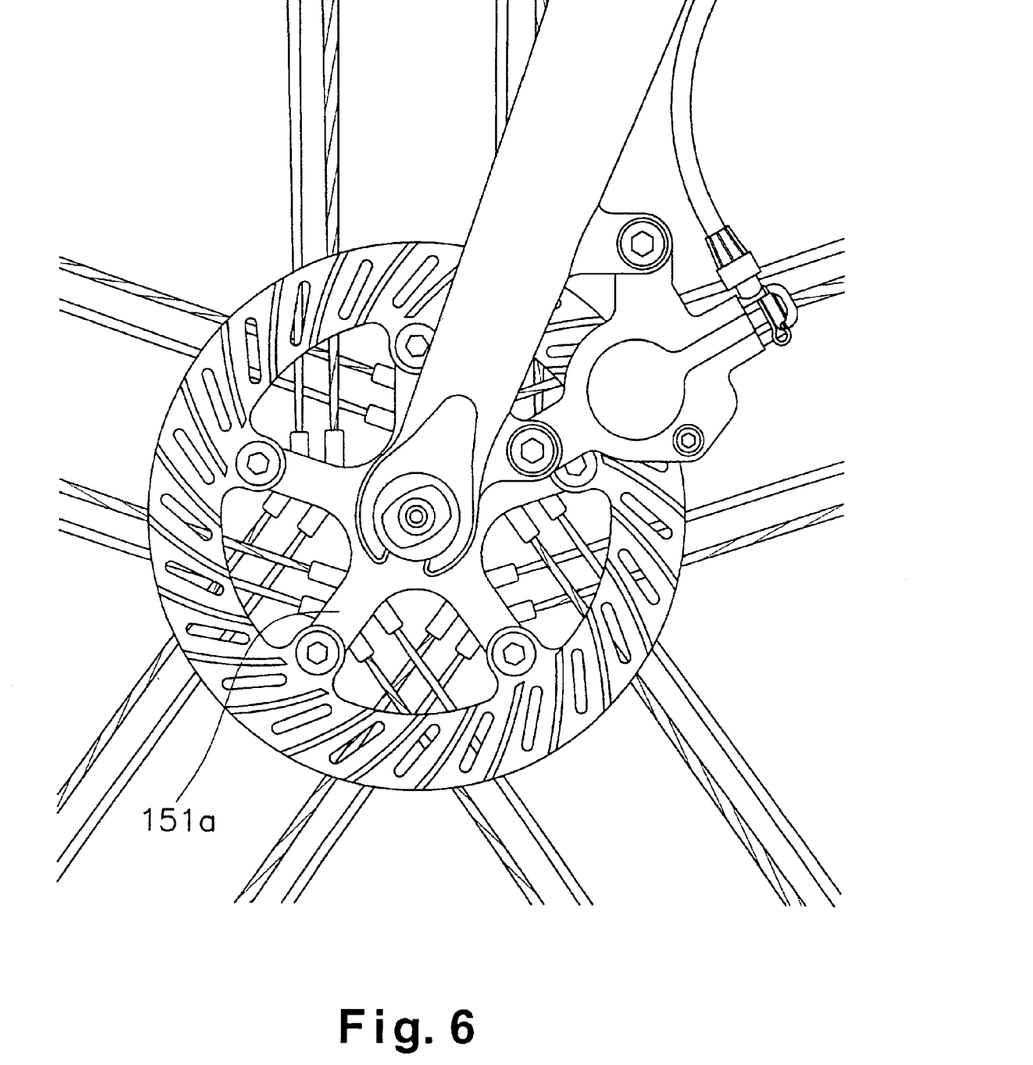
FIG. 6 is a fragmentary side elevational view of a front hub corresponding to FIG. 4 according to another embodiment of the present invention.

In the embodiment previously described, four first and second arms 51a and 51b are provided to the hub shell 41. However, fewer or more arms can be used as needed and/or desired. For example, as seen in FIGS. 5 and 6 a front hub 130 is provided with a hub shell 141 that has five equally spaced apart first and second arms 151a with a brake mount 145 having a rotor attachment unit 152 (a plurality of attachment members) formed at the free ends of the first arms 151a. The remaining structure of the front hub 130 is the same as the front hub 30. Thus, the front hub 130 will not be discussed or illustrated in detail herein.

Figure 7:
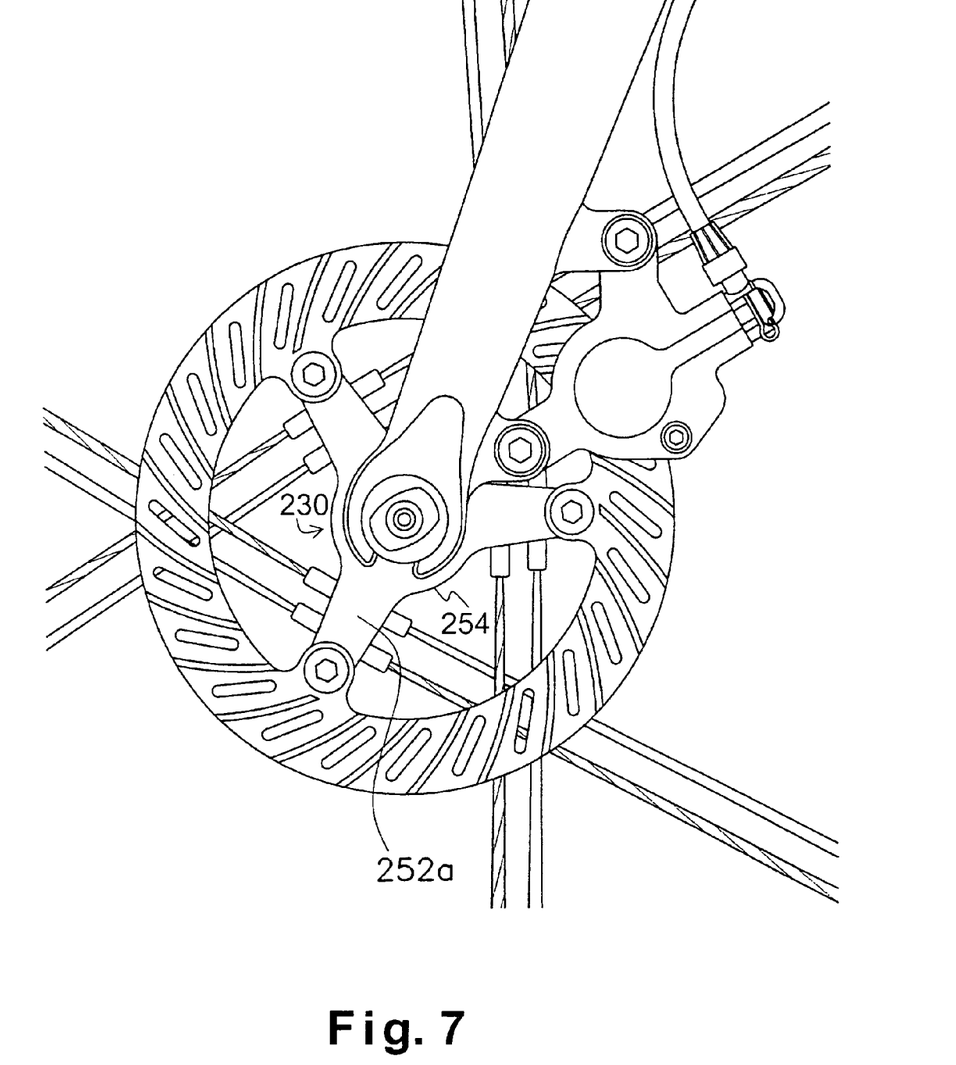
FIG. 7 is a fragmentary side elevational view of a front hub corresponding to FIG. 4 according to yet another embodiment of the present invention.

As shown in FIG. 7, a front hub 230 has a pair of hub flanges 254 (only the first flange is shown in FIG. 7) with one of the hub flange 254 having a plurality (three) of equally spaced apart arms 252a. The remaining structure of the front hub 230 is the same as the front hub 30. Thus, the front hub 230 will not be discussed or illustrated in detail herein.

Figure 8:
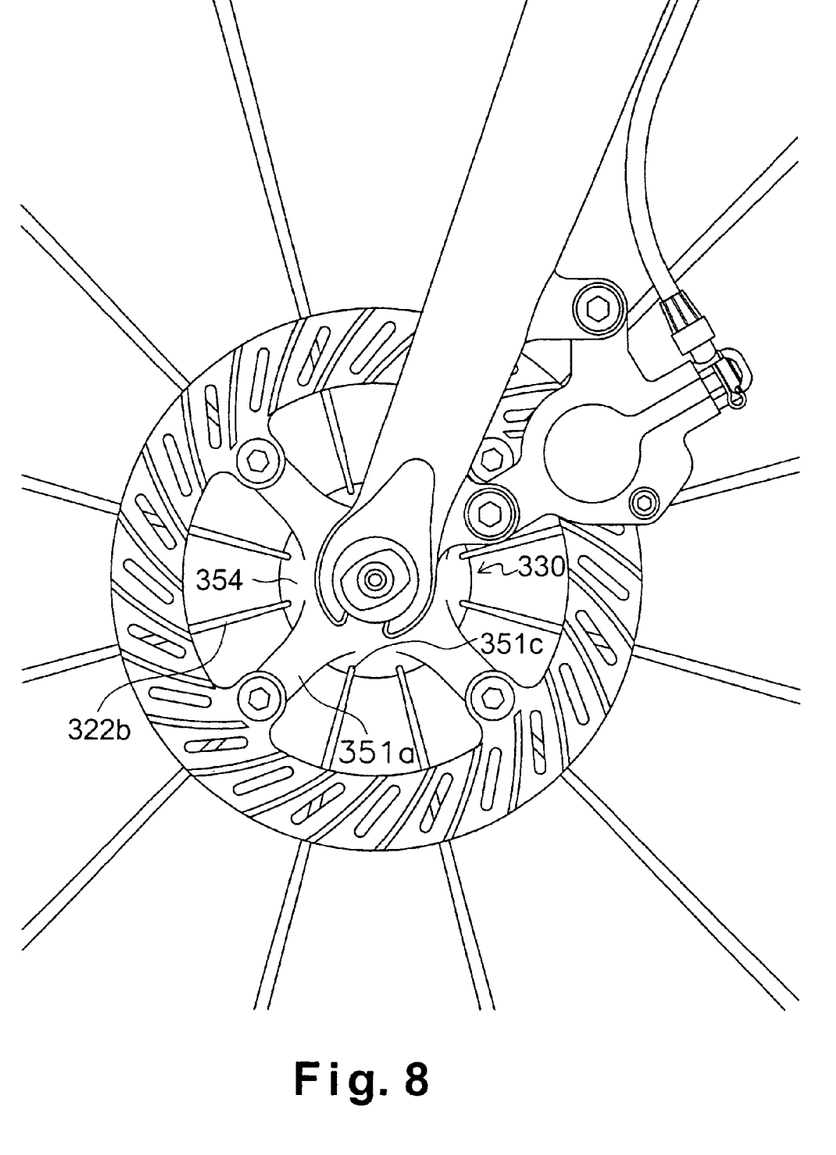
FIG. 8 is a fragmentary side elevational view of a front hub corresponding to FIG. 4 according to yet another embodiment of the present invention.

In the first embodiment, previously described, the spoke attachment holes 41c and 51d are formed on the first arms 51a. However, as shown in FIG. 8, a front hub 330 has a pair of hub flanges 354 (only the first flange is shown in FIG. 8) with one of the hub flange 354 having a plurality of arms 351a. The hub flanges 354 are formed on the large-diameter sections of the hub shell with diameters that are greater than in other sections. The hub flange on the other side of hub shell in this embodiment does not have any arms. Each of the hub flanges 354 has spoke attachment points or holes 351a that are formed at spaced intervals in the circumferential direction on the hub flanges 354. The spokes 322b in this embodiment are disposed in a radial pattern in the radial direction. The spoke wires of the spokes 322b are locked in the spoke attachment parts or holes 351c. The number of arms should be between two and ten in this embodiment.

Figure 9A:
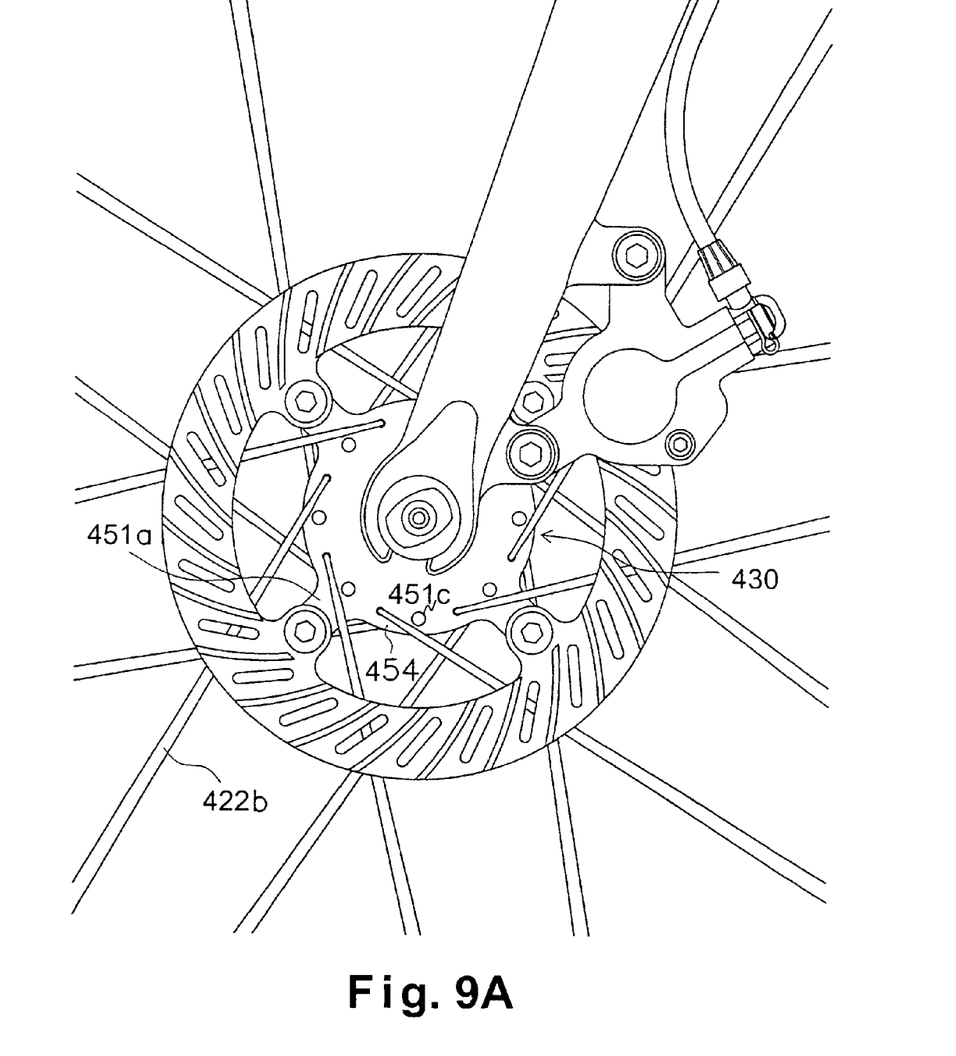
FIG. 9A is a fragmentary side elevational view of a front hub corresponding to FIG. 4 according to yet another embodiment of the present invention.
Figure 9B:
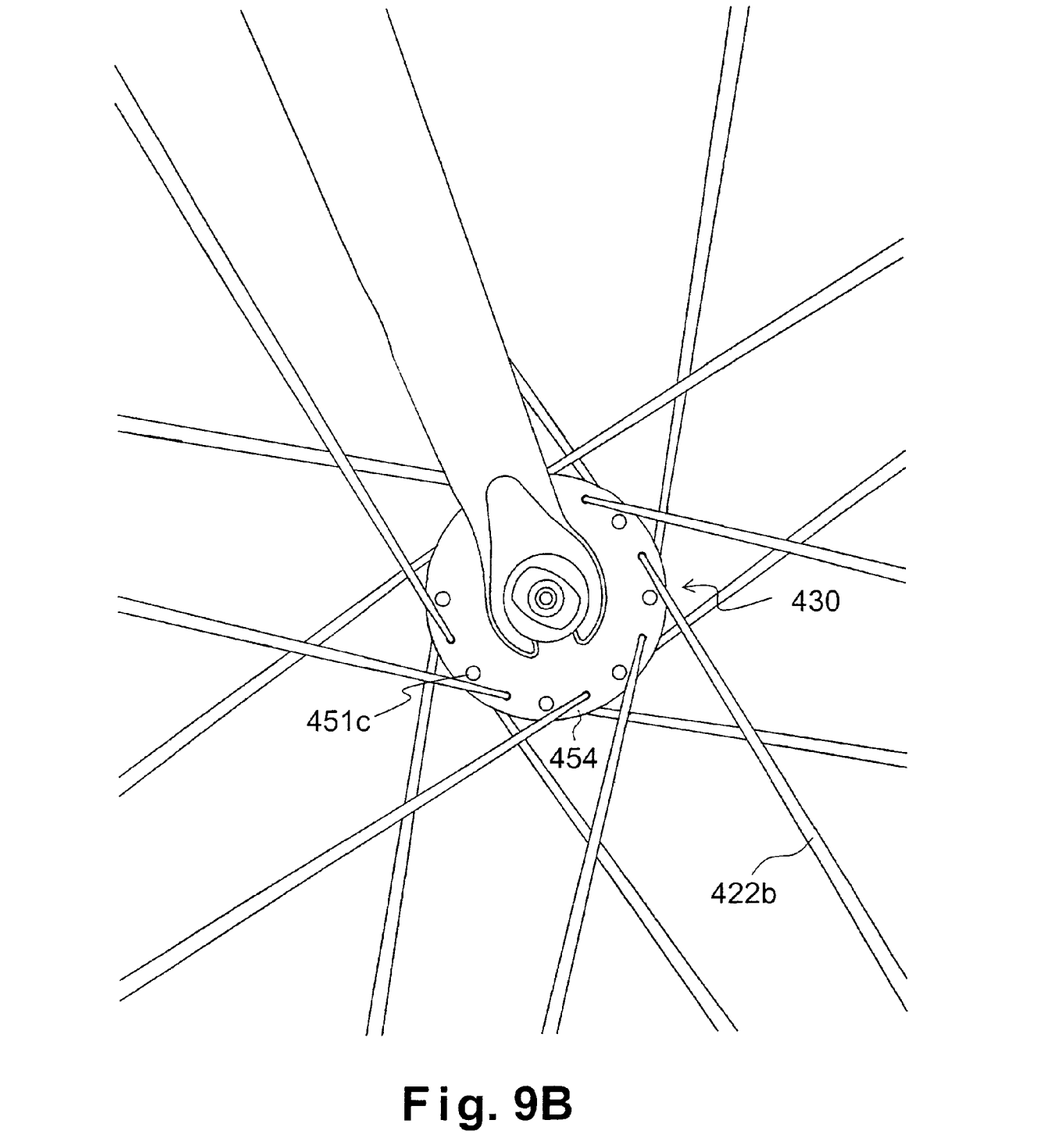
FIG. 9B is a fragmentary side elevational view of the other side of the front hub illustrated in FIG. 9B according to the present invention.

As shown in FIGS. 9A and 9B, a front hub 430 has a pair of hub flanges 454 with one of the hub flange 454 having a plurality of arms 451a. The hub flanges 454 are formed on the large-diameter sections of the hub shell with diameters that are greater than in other sections. The hub flange 454 on the other side of hub shell in this embodiment does not have any arms. Each of the hub flanges 454 has spoke attachment points or holes 451a that are formed at spaced intervals in the circumferential direction on the hub flanges 454. The spokes 422b in this embodiment are slanted in relation to the radial direction, which is the same as the usual arrangement. The spoke wires of the spokes 422b are locked in the spoke attachment parts or holes 451c. The number of arms should be between two and ten in this embodiment.

The present invention was applied to a front hub in the embodiment previously described with reference to FIGS. 5–9B, but the present invention can also be applied to a rear hub having the same mounting structures of FIGS. 5–9B as described above. Also, the configuration of the hub is not limited to the embodiment previously described, and particularly the configuration of the hub shell need not have a unitary construction and may have any kind of shape, such as a segmented structure configured from a plurality of members. Furthermore, the interior of the hub may comprise a brake adjusting mechanism, a power generating mechanism, or a speed shifting mechanism.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention. The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2003-002753. The entire disclosure of Japanese Patent Application No. 2003-002753 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub comprising:

a hub axle having a center axis;

a hub shell rotatably supported on the hub axle by bearings about the center axis, the hub shell including a first end having a first spoke attachment part with a plurality of first spoke attachment points radially spaced from the center axis for attaching a plurality of first spokes thereto and a second end having a second spoke attachment part with a plurality of second spoke attachment points radially spaced from the center axis for attaching a plurality of second spokes; and a brake mount having a rotor attachment unit integrally formed with the first spoke attachment part, the rotor attachment unit being configured and arranged with a plurality of rotor attachment points to secure a disc rotor of a disc brake device thereto, the rotor attachment points of the brake mount being disposed radially farther out from the center axis than a minimum radial position of the first spoke attachment points at which the first spokes are attached to the first spoke attachment part, the rotor attachment unit including a plurality of first arms extending radially from the first end of the hub shell in a circumferential pattern with the rotor attachment points being disposed at outer tips of the first arms, and the first spoke attachment points being disposed on the first arms, each of the first arms including a pair of the first spoke attachment points that are substantially radially arranged relative to each other.

2. A bicycle hub comprising:

a hub axle having a center axis;

a hub shell rotatably supported on the hub axle by bearings about the center axis, the hub shell including a first end having a first spoke attachment part with a plurality of first spoke attachment points radially spaced from the center axis for attaching a plurality of first spokes thereto and a second end having a second spoke attachment part with a plurality of second spoke attachment points radially spaced from the center axis for attaching a plurality of second spokes; and a brake mount having a rotor attachment unit integrally formed with the first spoke attachment part, the rotor attachment unit being configured and arranged with a plurality of rotor attachment points to secure a disc rotor of a disc brake device thereto, the rotor attachment points of the brake mount being disposed radially farther out from the center axis than a minimum radial position of the first spoke attachment points at which the first spokes are attached to the first spoke attachment part, the rotor attachment unit including a plurality of first arms extending radially from the first end of the hub shell in a first circumferential pattern with the rotor attachment points being disposed at outer tips of the first arms and the first spoke attachment points being disposed on the first arms, the second end of the hub shell including a plurality of second arms arranged in a second circumferential pattern that matches the first circumferential pattern of the first arms as viewed along the center axis with the second spoke attachment points being disposed on the second arms.

3. The bicycle hub according to claim 1, wherein the rotor attachment unit protrudes radially farther out than the first spoke attachment points of the first spoke attachment part.

4. The bicycle hub according to claim 1, wherein the second end of the hub shell includes a freewheel operatively coupled between the axle and the second end of the hub shell with at least one sprocket mounted on an outer periphery of the freewheel.

5. The bicycle hub according claim 1, wherein the first and second spoke attachment points include holes with spoke nipples coupled thereto.

6. The bicycle hub according claim 1, wherein the hub axle includes a through-hole formed in its center with a quick release mechanism mounted therein, the quick release mechanism having a quick hub rod with threaded portions formed at both ends.

7. The bicycle hub according claim 2, wherein the rotor attachment unit protrudes radially farther than the spoke attachment points of the first spoke attachment part.

8. The bicycle hub according claim 2, wherein the hub axle is configured and arranged to be mounted on a front fork of a bicycle.

9. The bicycle hub according claim 2, wherein the second end of the hub shell includes a freewheel operatively coupled between the axle and the second end of the hub shell with at least one sprocket mounted on an outer periphery of the freewheel.

10. The bicycle hub according claim 2, wherein the first and second spoke attachment points include holes with spoke nipples coupled thereto.

11. The bicycle hub according claim 2, wherein the hub axle includes a through-hole formed in its center with a quick release mechanism mounted therein, the quick release mechanism having a quick hub rod with threaded portions formed at both ends.

12. A bicycle hub comprising:

a hub axle having a center axis;

a hub shell rotatably supported on the hub axle by bearings about the center axis, the hub shell including a first end having a first spoke attachment part with a plurality of first spoke attachment points spaced in a radial direction from the center axis for attaching a plurality of first spokes thereto and a second end having a second spoke attachment part with a plurality of second spoke attachment points spaced in the radial direction from the center axis for attaching a plurality of second spokes thereto;

a brake mount having a rotor attachment unit integrally formed with the first spoke attachment part, the rotor attachment unit being configured and arranged with a plurality of rotor attachment points, the rotor attachment points of the brake mount being disposed radially farther out than a minimum radial position of the first spoke attachment points at which the first spokes are attached to the first spoke attachment part; and a disc brake rotor having a plurality of hub attachment points disposed about an inner periphery thereof that are configured and arranged to be attached to the rotor attachment points of the brake mount.

13. The bicycle hub according claim 12, wherein
the rotor attachment unit includes a plurality of first arms extending radially from the first end of the hub shell in a first circumferential pattern with the rotor attachment points disposed at outer tips of the first arms and the first spoke attachment points disposed on the first arms.

14. The bicycle hub according claim 13, wherein
the second end of the hub shell includes a plurality of second arms arranged in a second circumferential pattern that matches the first circumferential pattern of the first arms as viewed along the center axis with the second spoke attachment points being disposed on the second arms.

15. The bicycle hub according claim 12, wherein
the hub axle is configured and arranged to be mounted on a front fork of a bicycle.

16. The bicycle hub according claim 12, wherein
the second end of the hub shell includes a freewheel operatively coupled between the axle and the second end of the hub shell with at least one sprocket mounted on an outer periphery of the freewheel.

17. The bicycle hub according claim 2, wherein
each of the first arms includes a pair of the first spoke attachment points that are substantially radially arranged relative to each other, and each of the second arms includes a pair of the second spoke attachment points that are substantially radially arranged relative to each other.

18. The bicycle hub according claim 1, wherein
the hub axle is configured and arranged to be mounted on a front fork of a bicycle.

19. The bicycle hub according claim 1, wherein
each pair of the first spoke attachment points arranged on one of the first arms includes an outer hole and an inner hole, the outer hole having an outer entrance opening located radially outwardly of an inner entrance opening of the inner hole and an outer exit opening located radially outwardly of an inner exit opening of the inner hole.

* * * * *